J. C. GATES.
FEATHERING VANED WINDMILL.
APPLICATION FILED JULY 23, 1920.

1,403,154.

Patented Jan. 10, 1922.
2 SHEETS—SHEET 1.

INVENTOR.
John C. Gates.
BY Charles L. Wright
his ATTORNEY

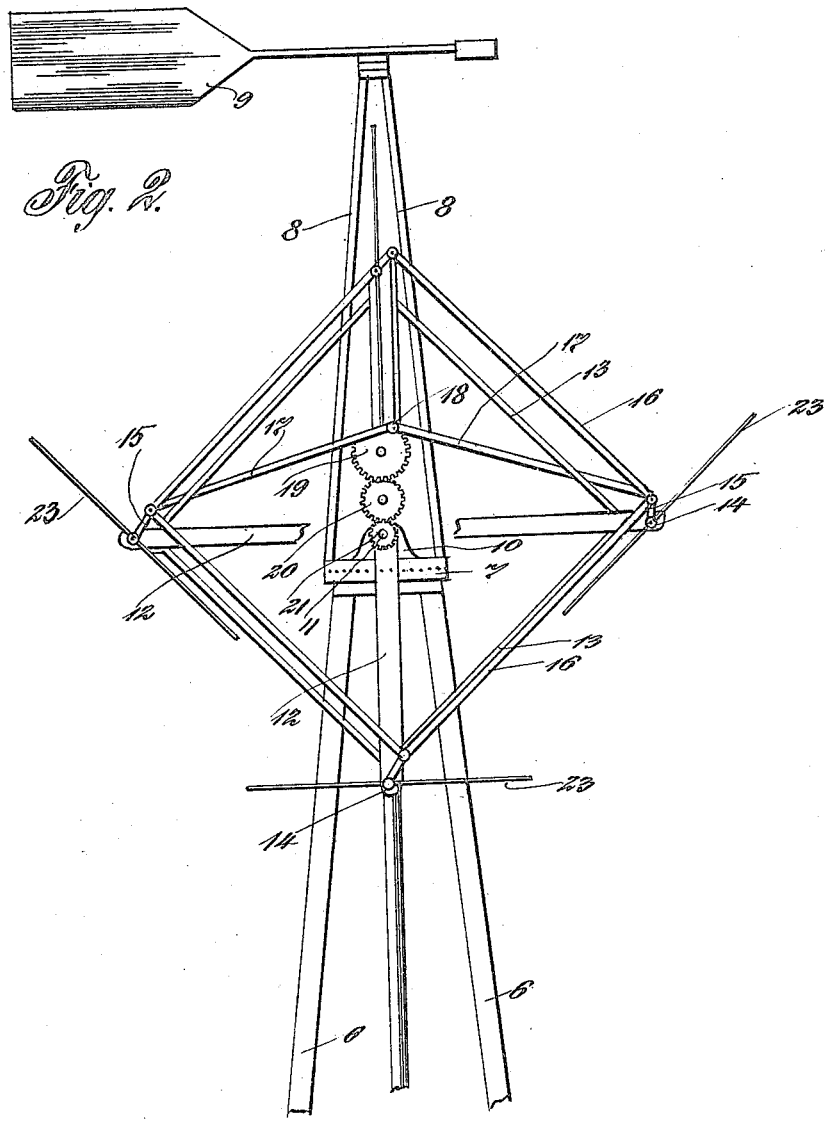

UNITED STATES PATENT OFFICE.

JOHN C. GATES, OF INDIANAPOLIS, INDIANA.

FEATHERING-VANED WINDMILL.

1,403,154.  Specification of Letters Patent.  Patented Jan. 10, 1922.

Application filed July 23, 1920. Serial No. 398,468.

*To all whom it may concern:*

Be it known that I, JOHN C. GATES, a citizen of the United States, and a resident of Indianapolis, in the county of Marion and State of Indiana, have invented certain new and useful Improvements in Feathering-Vaned Windmills, of which the following is a specification.

The principal object of this invention is to provide a windmill having a pair of wind wheels mounted upon a single horizontal shaft, on opposite sides of a housing rotatable upon a standard through which the vertical drive shaft passes.

Another object is to provide the wheels with horizontally pivoted vanes and mechanism whereby each vane, as it assumes its highest position, is moved into a vertical plane, the vane rotating into a horizontal plane at its lowest point, or "feathering" as the wheel is rotated.

These objects are attained by the novel devices described in this specification, shown in the drawings forming a part thereof and pointed out in the appended claim.

Figure 2 is an adjacent side elevational view thereof.

Figure 1:
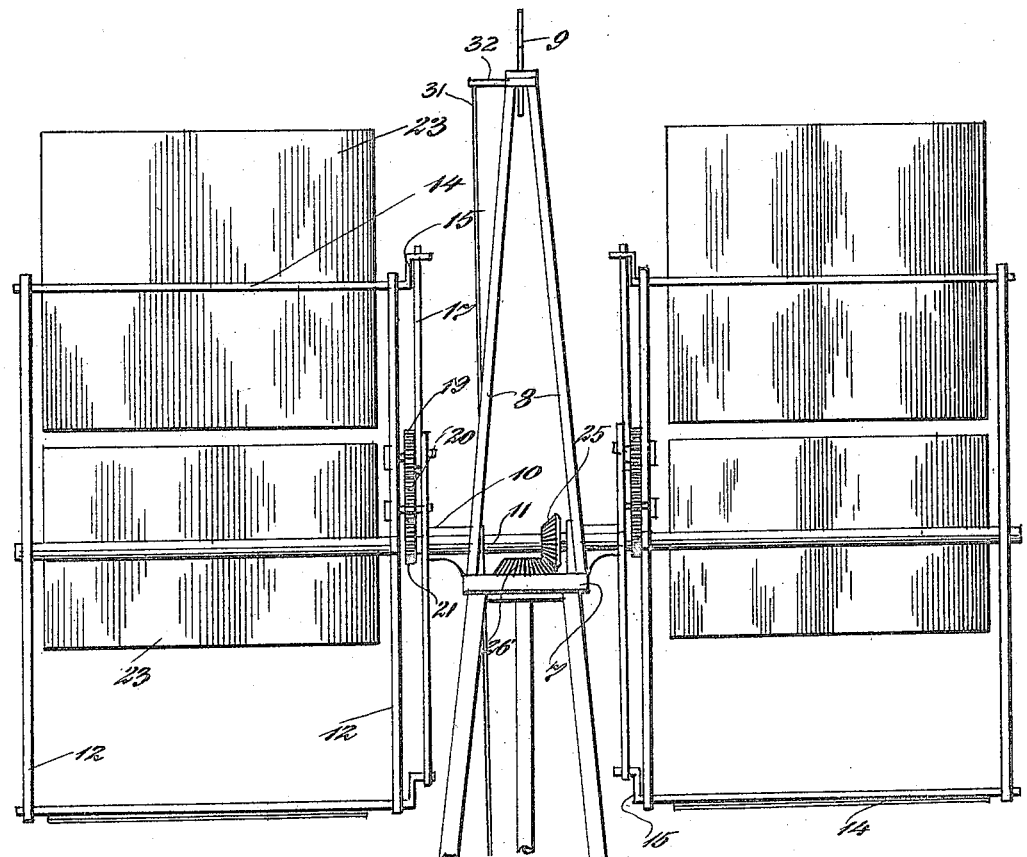
Figure 1 is a side elevational view of the windmill.

In the drawings the numeral 5 designates the base of a standard 6 having a turn-table 7 at its upper end on which is revolubly mounted a superstructure 8 carrying a vane or rudder 9 so disposed as to turn the upper structure in accordance with the direction of the wind.

On the base of the upper structure are secured a pair of brackets 10 in which is journalled a horizontal shaft 11 to which are attached the wind wheels, comprised of crossed bars 12, braced by square skeleton frames 13 near their outer ends.

Rotatably mounted in the ends of the bars 12 are shafts 14 formed at their inner ends into cranks 15 connected by other square frame elements 16 and driven by rods 17 attached to crank pins 18 set in the sides of gears 19 rotatable on pins extending from the inner bars 12.

These gears mesh with intermediates 20 driven in planetary movement about the pinions 21 fastened to the brackets 10, through motion derived from the rotation of the wind wheel.

Thus as the shaft 11 revolves, by reason of the gear trains, rotary motion is transmitted to the shafts 14 giving the vanes 23 a rotary motion independent of that transmitted to the wheel of which they are a part, and, if the gears are properly proportioned, the vanes will be in vertical position when at the upper side of the wheel, and in a horizontal plane when at the lower side of the wheel, the transition taking place gradually as the wheels are rotated, effecting a feathering action whereby the vanes are exposed to the wind in the most effective manner.

Obviously the gear 25 on the shaft 11 will drive its mate 26 on the vertical shaft 27, and thus through the bevel gears 28 and 29 the jack shaft 30 will be actuated.

In order to temporarily prevent the apparatus from operating, the rudder 9 is rotated on its horizontal axis by pulling upon a rope 31, fastened at its upper end to an arm 32 extending out from the rudder shank as shown in Figure 1, a spring (not shown) returning the rudder to its normal operative position when the rope is loosened.

Having thus described my invention, what I claim as new and desire to secure by Letters Patent, is:—

In a wind mill comprising a standard, a raised structure rotatable thereon, a drive shaft vertically disposed in the standard, a wheel operating shaft horizontally positioned through the upper structure, gears communicating motion between said shafts, rectangular skeleton frames fixed upon opposite end portions of the operating shaft, vanes pivoted at the corners of said frames, means for causing said vanes to be rotated into vertical position when at highest point and in horizontal position when at the lowest point of the frames' rotation, a planetary gear train fixed with said wheel frame, a crank pin in one of said gears, cranks formed on the inner sides of the vane pivot rods, means connecting said crank pins and vane cranks for causing the vanes to oscillate, and means for manually rotating the vane carrying structure into the positions parallel to the direction of the wind.

In testimony whereof I have signed my name to this specification.

JOHN C. GATES.